US007413630B2

(12) United States Patent
Graff et al.

(10) Patent No.: US 7,413,630 B2
(45) Date of Patent: Aug. 19, 2008

(54) MULTI-LAYER SHEET OF ABSORBENT PAPER

(75) Inventors: Pierre Graff, Wolfgantzen (FR); Benoît Hoeft, Bischwihr (FR)

(73) Assignee: Georgia-Pacific France, Kunheim (FR)

( * ) Notice: Subject to any disclaimer, the term of this patent is extended or adjusted under 35 U.S.C. 154(b) by 578 days.

(21) Appl. No.: 10/498,218

(22) PCT Filed: Dec. 6, 2002

(86) PCT No.: PCT/FR02/04215

§ 371 (c)(1),
(2), (4) Date: Jul. 13, 2004

(87) PCT Pub. No.: WO03/050353

PCT Pub. Date: Jun. 19, 2003

(65) Prior Publication Data

US 2005/0034828 A1 Feb. 17, 2005

(30) Foreign Application Priority Data

Dec. 12, 2001 (EP) ................................ 01403221

(51) Int. Cl.

| | |
|---|---|
| ***D21H 27/30*** | (2006.01) |
| ***D21H 27/40*** | (2006.01) |
| ***B31F 1/07*** | (2006.01) |
| ***B32B 29/00*** | (2006.01) |

(52) U.S. Cl. ....................... 162/123; 162/109; 162/117; 162/132; 428/156; 428/172

(58) Field of Classification Search ......... 162/123–133, 162/117, 111–113, 109; 428/156, 172, 537.5, 428/153–154, 174, 166; 264/175; 156/209, 156/219
See application file for complete search history.

(56) References Cited

U.S. PATENT DOCUMENTS 2,043,351 A * 6/1936 Fourness et al. ............ 428/153

(Continued)

FOREIGN PATENT DOCUMENTS

EP 1 101 866 A1 5/2001

(Continued)

*Primary Examiner*—José A Fortuna
(74) *Attorney, Agent, or Firm*—Breiner & Breiner, LLC

(57) ABSTRACT

The present invention relates to a multi-ply sheet including a first ply (12) and a second ply (14) each made of tissue paper and each exhibiting a specific surface weight between 12 and 35 g/m$^2$, the first ply including a first embossing pattern which is imprinted in first zones (16) and which has first protrusions (18) projecting from the inner surface of the first ply and corresponding to alveoles on the outer surface that constitute in particular first arrays, at least part of the protrusions' tops (19) being linked to the opposite inner surface of the second ply (14). This sheet is characterized in that the first ply (12) includes a second embossing pattern constituted by second protrusions (38) projecting from the first ply's inner surface and of which the height relative to the first protrusions is shallower, the density with respect to area of the second protrusions being greater and at least part of their tops being situated in the same plane as the tops of the first protrusions and at least part of the first ply's second protrusions' tops being linked to the inner surface of the second ply.

7 Claims, 4 Drawing Sheets

U.S. PATENT DOCUMENTS

| | | | | |
|---|---|---|---|---|
| 2,177,490 | A | 10/1939 | Kieffer | |
| 3,414,459 | A | 12/1968 | Wells | |
| 3,867,225 | A | 2/1975 | Nystrand | |
| 4,320,162 | A | 3/1982 | Schulz | |
| 4,659,608 | A | 4/1987 | Schulz | |
| 4,927,588 | A * | 5/1990 | Schulz | 264/258 |
| 4,978,565 | A * | 12/1990 | Pigneul et al. | 428/156 |
| 5,093,068 | A * | 3/1992 | Schulz | 264/284 |
| 5,562,805 | A * | 10/1996 | Kamps et al. | 162/117 |
| 5,702,571 | A * | 12/1997 | Kamps et al. | 162/117 |
| 5,840,404 | A * | 11/1998 | Graff | 428/154 |
| 5,861,081 | A | 1/1999 | Bredendick et al. | |
| 6,253,373 | B1 * | 6/2001 | Peri | 717/150 |
| 6,365,000 | B1 * | 4/2002 | Dwiggins et al. | 162/111 |
| 6,423,397 | B1 * | 7/2002 | Roussel | 428/156 |
| 6,524,683 | B1 * | 2/2003 | Roussel et al. | 428/172 |
| 6,551,691 | B1 * | 4/2003 | Hoeft et al. | 428/172 |
| 6,589,634 | B2 * | 7/2003 | Schultz et al. | 428/195.1 |
| 6,942,755 | B2 * | 9/2005 | Basler et al. | 162/117 |
| 7,083,845 | B2 * | 8/2006 | Graff | 428/166 |
| 2001/0008179 | A1 * | 7/2001 | Oriarian et al. | 162/109 |
| 2002/0155257 | A1 * | 10/2002 | Schultz et al. | 428/195 |
| 2002/0160155 | A1 * | 10/2002 | Muller | 428/172 |
| 2003/0021954 | A1 * | 1/2003 | Graff | 428/156 |
| 2003/0026953 | A1 * | 2/2003 | Muller | 428/174 |
| 2003/0118782 | A1 * | 6/2003 | Graff | 428/172 |
| 2005/0034828 | A1 * | 2/2005 | Graff et al. | 162/123 |
| 2005/0067089 | A1 * | 3/2005 | Graff et al. | 156/209 |
| 2005/0103456 | A1 * | 5/2005 | Hein et al. | 162/117 |
| 2007/0122595 | A1 * | 5/2007 | Basler et al. | 428/174 |

FOREIGN PATENT DOCUMENTS

| | | | |
|---|---|---|---|
| EP | 1101867 | A1 * | 5/2001 |
| EP | 1270196 | A1 * | 1/2003 |
| EP | 1319748 | A1 * | 6/2003 |
| WO | WO 99/36253 | A1 | 7/1999 |
| WO | WO 00/40800 | A1 | 7/2000 |
| WO | WO 02068758 | A1 * | 9/2002 |
| WO | WO 03050353 | A2 * | 6/2003 |

* cited by examiner

MULTI-LAYER SHEET OF ABSORBENT PAPER

FIELD OF INVENTION

The present invention relates to sanitary or household absorbent papers, in particular to creped cellulose-web papers, hereafter tissue papers.

More specifically, the invention concerns paper towels for industrial or household uses. In this application the papers exhibit wet strength resulting from the addition of a specific resin to the pulp containing the suspended paper fibers before the sheet is formed. Once crosslinked, the resin constitutes a structure which at least temporarily resists the degrading effects of water.

BACKGROUND OF THE INVENTION

It is known in this field to make paper sheets consisting of several creped plies exhibiting a specific surface weight between 12 and 30-35 g/m$^2$ and fitted with protrusions made by embossing.

Embossing imparts bulk to the sheet and improves touch, softness and liquid absorption. Attempts already have been made to further improve absorptivity by means of multi-ply sheets made by linking at least two plies, each consisting of at least one of the embossed foils.

In this manner a sheet of several plies is attained which offers specific mechanical features, such as tensile strength and absorptivity.

Presently there are two embossing and ply-joining modes depending on the desired properties of the end product.

The first mode relates to “nesting”. It consists in first embossing each ply separately so as to form at the surface generally substantially frustoconical or frusto-pyramidal protrusions. Next, an adhesive is deposited on the top of the protrusions of one of the plies following its embossing but before it is detached from the embossing cylinder. The plies are mutually lined up in such a way that the protrusions of one ply face the protrusions of the other and that these protrusions of one side and the other shall nest between one another. Finally they are assembled by moving them close together. Accordingly, the two plies are connected by films of adhesive at the protrusion tops of one ply and unembossed zones which are situated between the protrusions of the other ply. The cavities subtended in this structure reliably assure improved absorption. Furthermore, the outer sides offer a smooth and velvety touch on account of the alveoles constituted by the backs of the protrusions. This technique is illustrated in U.S. Pat. No. 3,867,225.

The second joining mode is known in the field as “tip-to-tip”. It differs from the preceding mode by the relative configuration of the two plies. After these were separately embossed, they are moved one on the other in a way to make the tips of the protrusions coincide in part or in whole. The plies are connected to each other by the tip-to-tip arrayed protrusions. This technique is illustrated in U.S. Pat. No. 3,414,459.

The products manufactured by the above techniques have long exhibited a plain embossing pattern wherein the protrusions were uniformly arrayed in two crossing directions. While such a pattern allows attaining homogeneous properties, its visual attractiveness is modest.

For several years already attempts have been made to enhance product appearance by spreading the protrusions in different ways. Applicant; for example, is marketing a paper towel of which the surface alveoles are arrayed in concentric circles suggesting the propagation of a liquid which was poured on an absorbent sheet being absorbed, or also surface wave propagation when a drop of water falls on a liquid. More specifically, such a pattern can consist of distinct first disk-shaped zones defined by three or four concentric circles. The disks in turn are regularly configured along crossing directions. Second zones defined between adjacent disks generally assume a diamond shape.

Provided such a pattern is visually perceptible to the user, it will be commercially significant.

BRIEF DESCRIPTION OF THE INVENTION

The objective of the present invention is to manufacture products exhibiting patterns of which the topography is emphasized and of which the visual perceptibility is enhanced.

Applicant attained this objective in the form of a multi-ply sheet comprising a first ply and a second ply, each made of tissue paper and exhibiting a specific surface weight between 12 and 35 g/m$^2$, the first ply comprising a first embossing pattern consisting of first protrusions projecting from the first ply’s inner surface and in particular subtending arrays and of which at least part of the tops is connected to the inner surface of the opposite second ply, the sheet being characterized in that the first ply comprises a second embossing pattern consisting of second protrusions projecting from the inner surface of the first play and of a lesser height and of which the density is higher and of which at least part of the tops are situated in the same plane as the tops of the first protrusions and where at least the part is connected to the inner surface of the second ply.

Thanks to the structure thusly defined, the visual perception of the first pattern is increased by creating on the outer surface second zones situated at a tier different from the first zones exhibiting the first pattern. The 3D effect is enhanced. Moreover, the sheet thickness is observed as being more homogeneous. Also this effect is intensified by the higher area density of the protrusions of the second zone.

The invention furthermore contains other features whether considered singly or in combination.

The area density of the protrusions configured on the first zones is less than 20 protrusions/cm$^2$ and preferably less than 12 protrusions/cm$^2$. Such a distribution of the first protrusions corresponds to protrusion heights between 1 and 2 mm. This design allows subtending spaces between the first embossed ply and the second ply that assure good absorption without thereby incurring degradation of crush resistance. This applies in particular when the second ply is unembossed in the zones facing the first and second zones.

The protrusions arrayed in the second zones are shallower than the first protrusions but their density exceeds 30 protrusions/cm$^2$, preferably being greater than 40 protrusions/cm$^2$. Because of their density and different height, the second protrusions constitutes plateaus improving the contrast with the first zones.

The first and the second zones are adjacent.

Third protrusions in the form of small partitions connect two adjacent first protrusions of an array. In order to further enhance the visual perceptibility of the first protrusion pattern, small partition-type protrusions are created to reinforce the layout of the array without thereby degrading the tear resistance.

The second ply is made by the “through-air-drying” method. The combination of an embossed tissue paper ply made conventionally by wet pressing with a ply made by means of through-air-drying is especially advantageous within the scope of the present invention. In this manner absorption is optimized with respect to mechanical strength.

The invention furthermore proposes a cylinder used to emboss the first ply. This cylinder is fitted with first embossing tips subtending arrays in first zones and with second embossing tips of lesser height but higher density. The tops of the first and second embossing tips are situated in the planes that are tangential to the cylinder generatrices.

The invention also proposes a method for manufacturing the product.

Other features and advantages of the invention are elucidated in the comprehensive following description and in relation to the attached drawings.

DETAILED DESCRIPTION OF THE INVENTION

Figure 1:
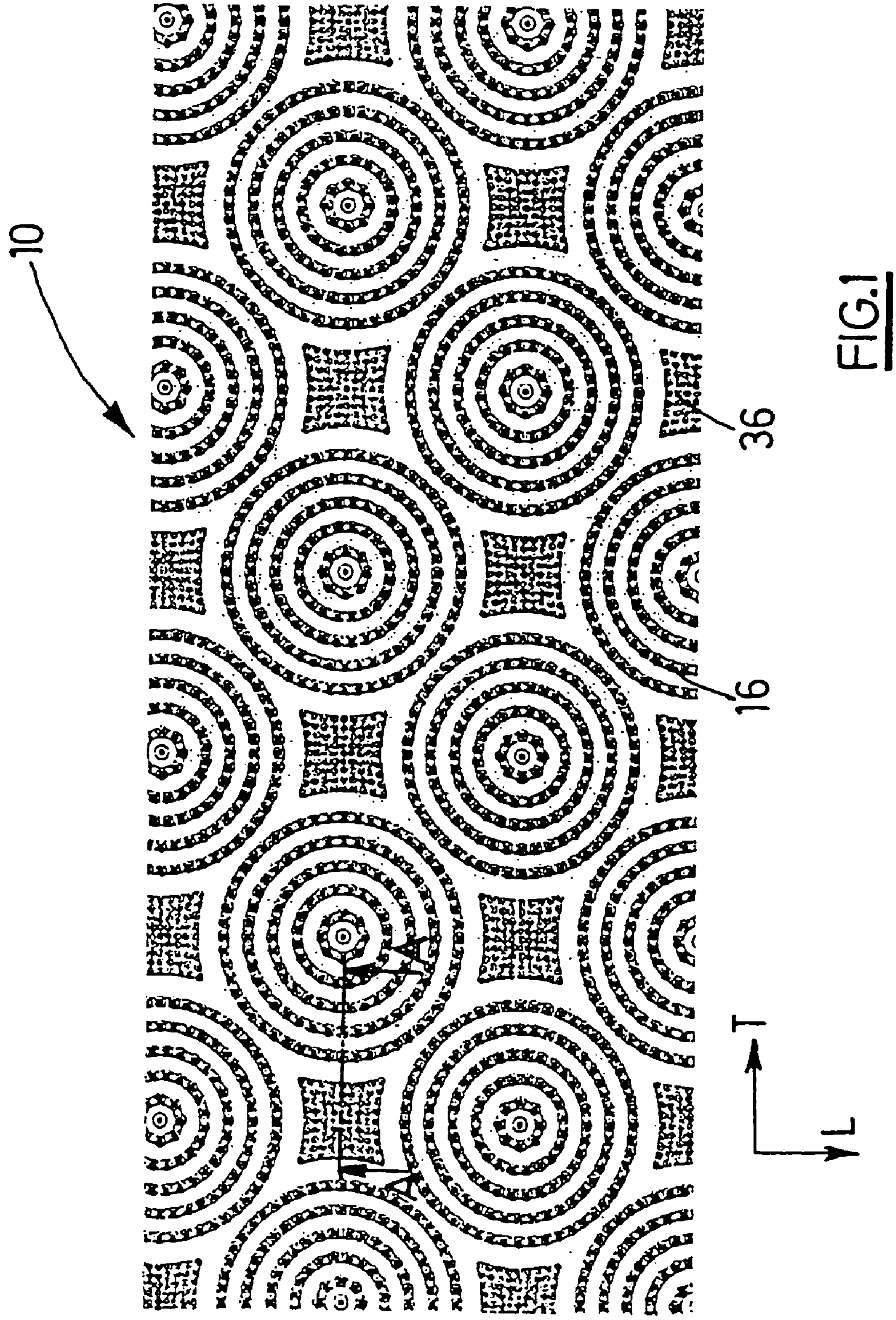
FIG. 1 is a top view of an illustrative embodiment of a multi-ply sheet of paper embossed in the manner of the invention.
Figure 2:
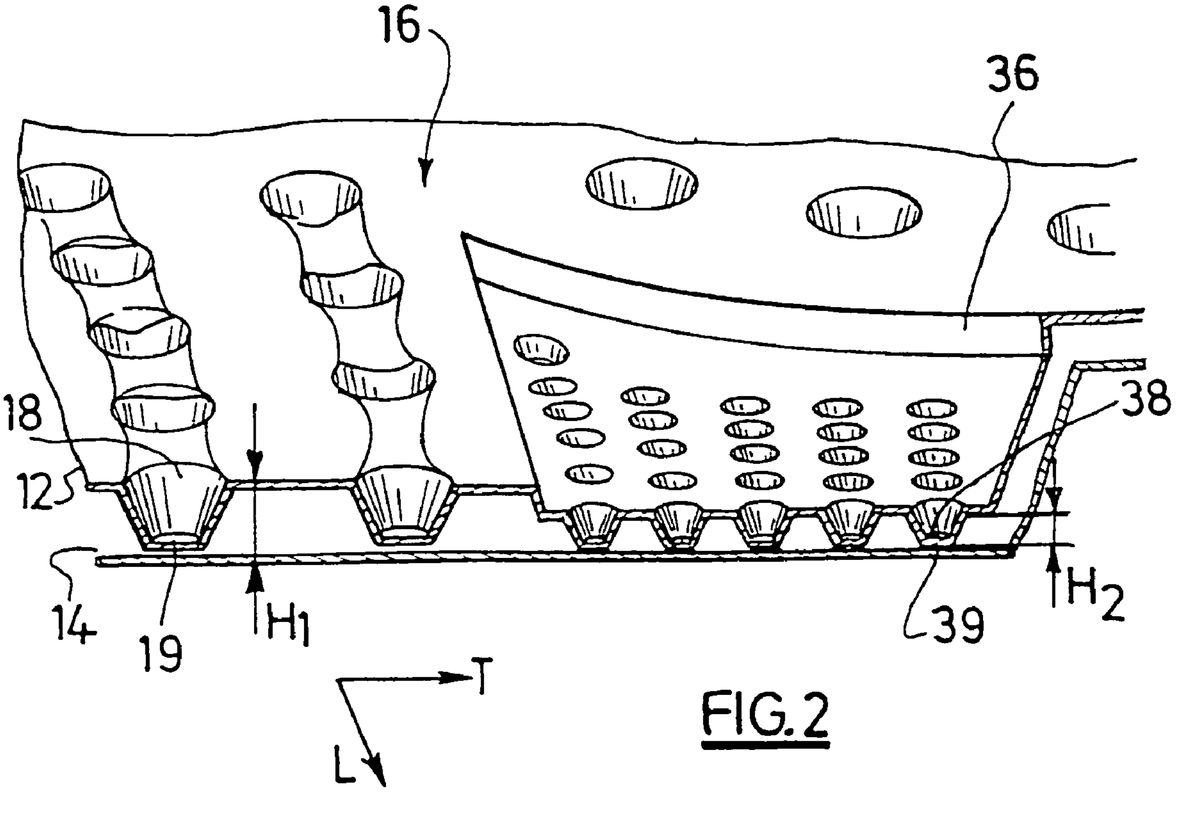
FIG. 2 is a schematic sectional and isometric view of a multi-ply sheet of paper of the invention.

FIGS. 1 and 2 show an illustrative embodiment of an absorbent sheet of paper 10 of stratified structure, that is of several plies. This sheet comprises two plies mounted one on the other, a first so-called upper ply 12 and a second so-called lower ply 14. This sheet is used as a paper towel and in particular for household purposes. Such a product is in the form of a roll of about fifty preperforated segments. The paper is tissue paper of a specific surface weight between 12 and 35 g/m$^2$. Illustratively, the upper ply 12 is made by conventional wet pressing abbreviated in the field as CWP. The ply 14 preferably is made by through-air-drying known in the field as TAD. In another embodiment mode, the two plies both are TAD.

Depending on the embodiment shown, the second ply can be unembossed.

In one CWP papermaking method, the water-suspended fibers are deposited on a wire to form a web. Then the web is drained and transferred on a felt to be forced with the felt by a press against a drying cylinder. The web then is detached from the cylinder and creped by means of a scraper blade. Lastly, it is wound on a reel before being transformed into a final product. This summarily described technique is called "conventional". There are of course many variants of it.

A TAD technique following draining consists in drying the web, at least partly until dryness is high enough to freeze the fibers within the web, without applying pressure to it. Where desired, drying is completed by applying the web against a heated cylinder. Thanks to this first drying stage, the web can be applied against the cylinder. The web retains part of its volume. This cylinder also allows creping it. Drying in absence of pressure is implemented by blowing hot air through the sheet after it was drained. This technique is known in the trade as TAD and allows attaining a thicker sheet of higher mass density than when using the conventional technique.

The web, i.e., the sheet 10 comprises two characteristic directions denoted by the arrows L and T in FIGS. 1 and 2 which correspond respectively to the sheet's direction of advance during its manufacture and the transverse direction to it.

The first embossing pattern 16 on the upper ply is shown as a whole in FIG. 1 and in detail in FIG. 2. This pattern comprises first and generally frustoconical protrusions 18 projecting into the sheet inside. Each protrusion is associated with an alveole on the other side of the ply 12 facing outward. The protrusions are configured as arrays, in this instance concentric circles, within first zones. The protrusions 18 exhibit a first height H1 between 0.5 and 1.5 mm. The density of the protrusions within the first zones is between 6 and 20 protrusions/cm$^2$, preferably between 9 and 12 protrusions/cm$^2$. The protrusion tops 19 make contact with the lower ply 14.

In this embodiment the first zones 16 therefore are disks. These disk in turn are configured in two crossing directions of a network of square meshes, in this instance at 45° relative to the direction of advance L. Inside each mesh constituted by the first zone disks are located second protrusions 38 constituting second zones 36. These protrusions 38 exhibit a height H2 shallower than that of the first protrusions 18. Height H2 is between 0.2 and 1.5 mm as indicated in FIG. 2. The second protrusions constitute a plateau of lesser thickness. With respect to the outer side, one alveole is shown opposite each protrusion 38. The protrusions 38 are distributed in a denser manner in the second zones 36 than are those of the first zones 16. The pattern density is between 30 and 80 protrusions/cm$^2$ and preferably between 40 and 60 protrusions/cm$^2$. The plateau or tier appearance is entailed by the comparatively tight configuration of the second protrusions that are distributed relatively homogeneously in this zone. A well-defined rise is evident at the edge of the zone which abuts the first zones. The tops of the second protrusions make contact with the ply 14. For some, and in particular for the assembly, a film of adhesive implements the connection between the ply 14 and at least some but preferably all the protrusion tops 39. This also applies to the tops of the protrusions 18 of the first zones. It is understood that the tops 19 and 39 are situated in the same plane as the ply 14.

The second ply 14 is unembossed. The height differential of H1 and H2 is between 0.3 and 1.3 mm.

Figure 3:
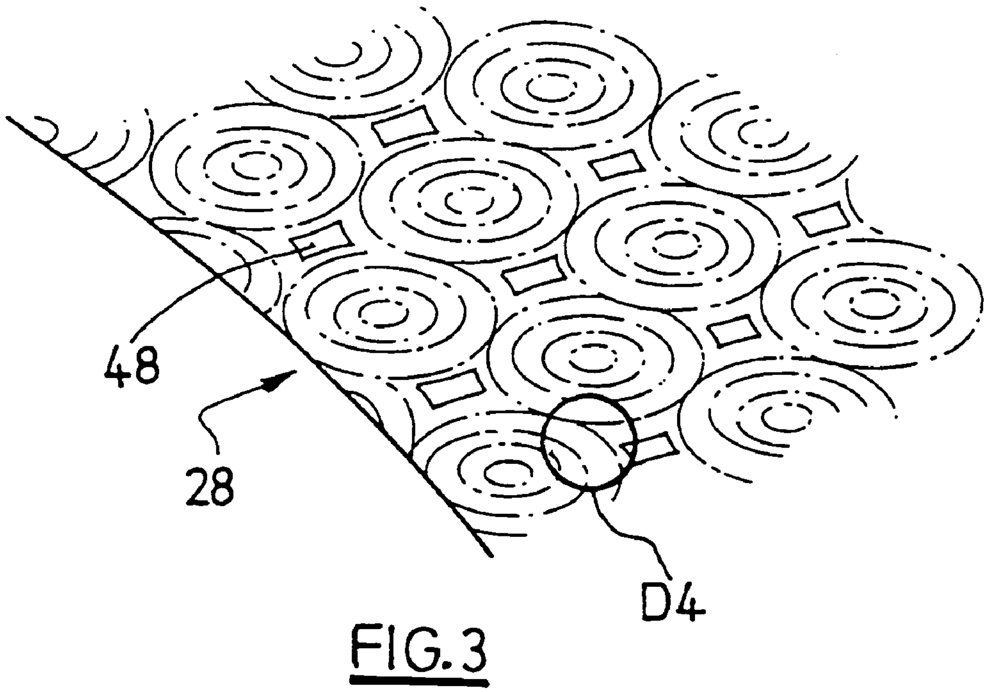
FIG. 3 is a schematic perspective showing the surface of an embossing cylinder.
Figure 4:
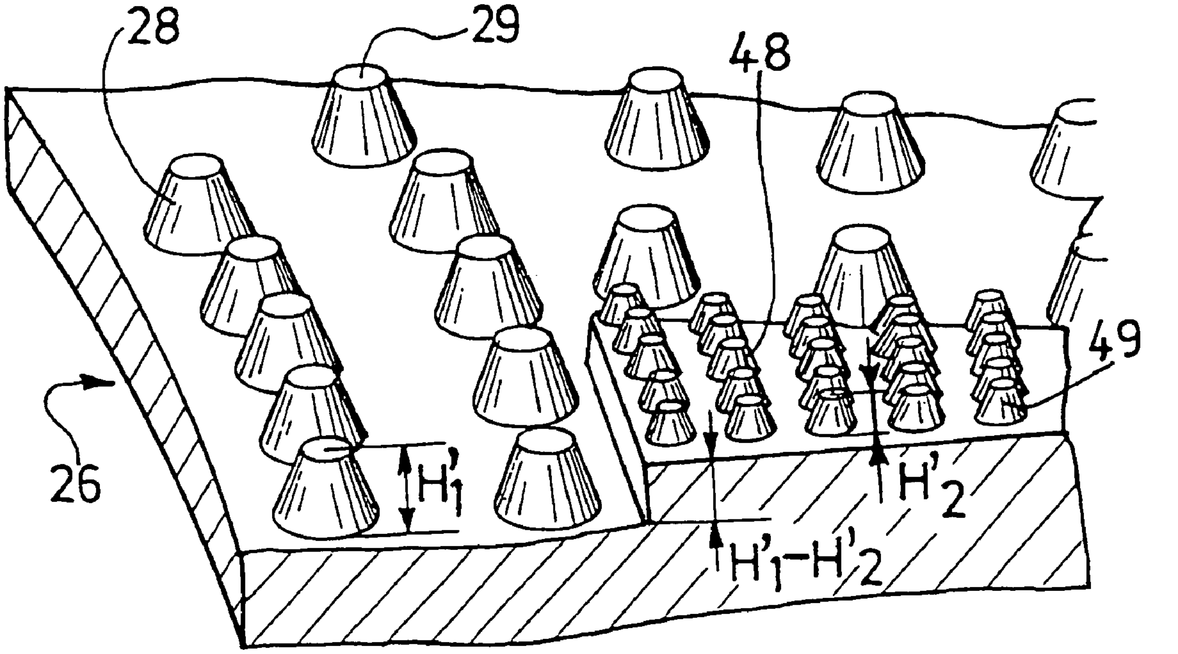
FIG. 4 is an enlarged view of the cylinder surface of FIG. 3.
Figure 6:
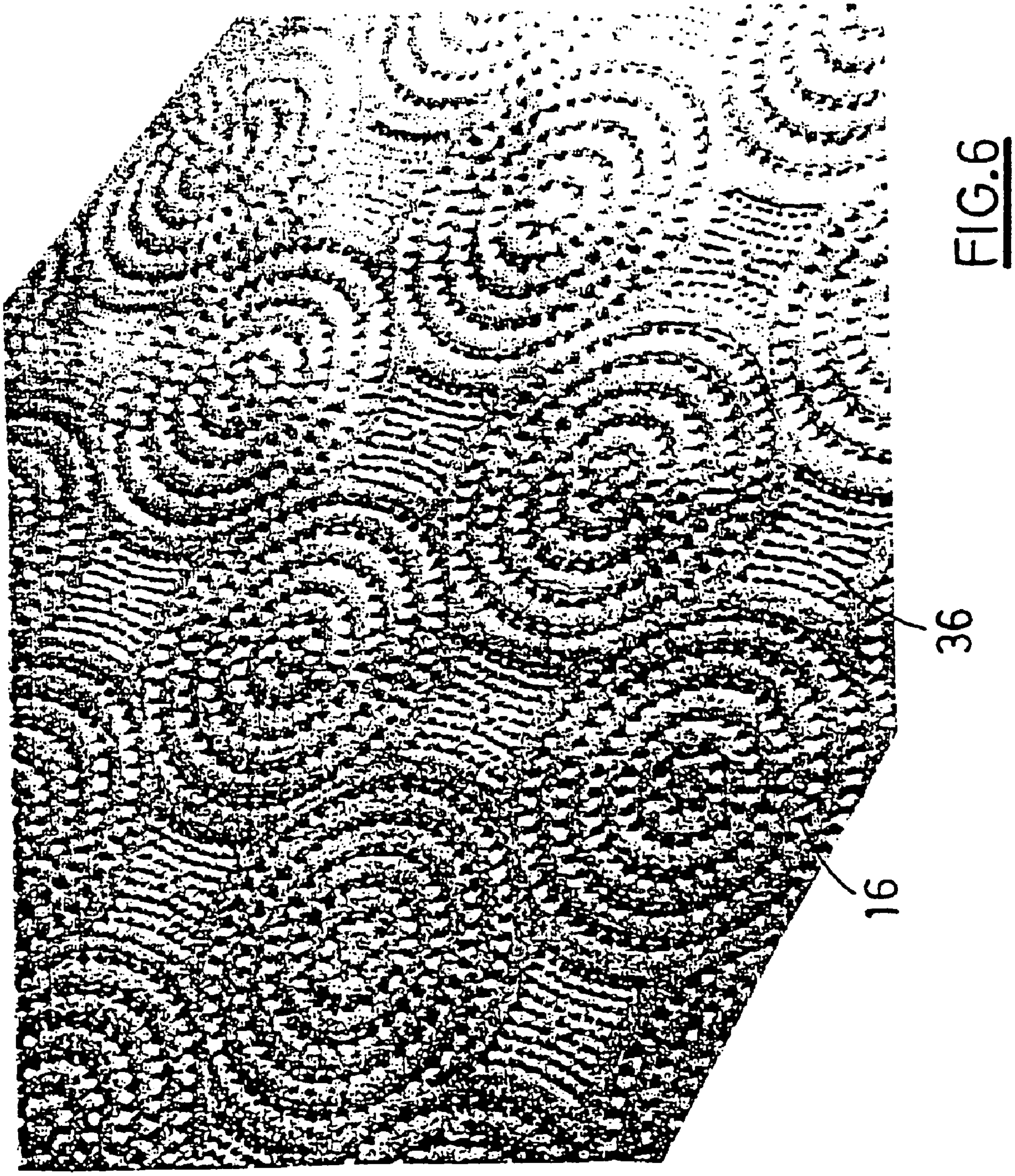
FIG. 6 is a photograph of a sheet of the invention.

An engraved cylinder, such as is shown in FIGS. 3 and 4, is used to emboss the upper ply. FIG. 3 shows the general appearance of the cylinder's surface with the arrays of the embossing tips 28 and 48 shown as the pattern of FIG. 1. The detailed view of FIG. 4 corresponds to reference D4 of FIG. 3 and show frustoconical first embossing tips 28 having a top 29 in the form of a flat. The protrusion slope is fairly high, being between 70° and 75°. The height H'1 of the embossing tips between the flats 29 and the bottom of the engraving 28 is at least equal to H1, namely $H'1 \geqq H1$. The protrusions 48 also are frustoconical and have a top in the form of a flat 49. The flats 49 are at the same altitude relative to the cylinder's axis of rotation as the tops 29. On the other hand, the engraving depth H'2 is less, namely $H'2 \leqq H'1$. The protrusions 48 are homogeneously distributed in the second zones.

In the shown embodiment, the embossing tips are frustoconical and have a circular base. Other geometries are also applicable, for instance rhomboids or pyramidal frustra with polygonal or linear bases.

The manufacturing method for a claimed sheet 10 consists in embossing a creped tissue paper ply on the cylinder by pressing the ply against the cylinder using a rubber cylinder or a cylinder made of another resilient material. The embossing pressure must be high enough that the tissue paper enters the space between the embossing tips of the first zones. In particular, within the first zones, the paper must penetrate a depth exceeding H'2. The second zones' geometry of a plateau with a tight pattern on the other hand restricts paper penetration between the embossing tips of the second zones. Instead the rubber is repelled toward the second zones' periphery. As a result this boundary between the first and the second zones shall be even more distinct.

In order to manufacture a two-ply sheet of the invention, adhesive is deposited on the flats 29 and 49. The flats being at the same height, the adhesive can be deposited in a simple manner using an adhesive-applying cylinder. Next, an unembossed ply is moved near and is pressed against the tops so that bonding is set up between the two plies along these tips. Once assembly has been achieved, the sheet is cut and wound conventionally into a finished product.

In this method, the bonding of the plies to one another is enhanced relative to a two-level embossing procedure of the prior art because all embossing tips have been bonded.

The above description relates to a two-ply sheet. However, the scope of the invention extends beyond two plies. Illustratively the embossed ply itself can consist of two layers; and so the unembossed ply. Obviously too the shown pattern is merely illustrative. Other patterns can be considered to the extent they conform to the disclosure of the present invention. In particular a special illustrative embodiment includes a pattern consisting at least in part of second protrusions linearly arrayed for example to show a flower.

Figure 5:
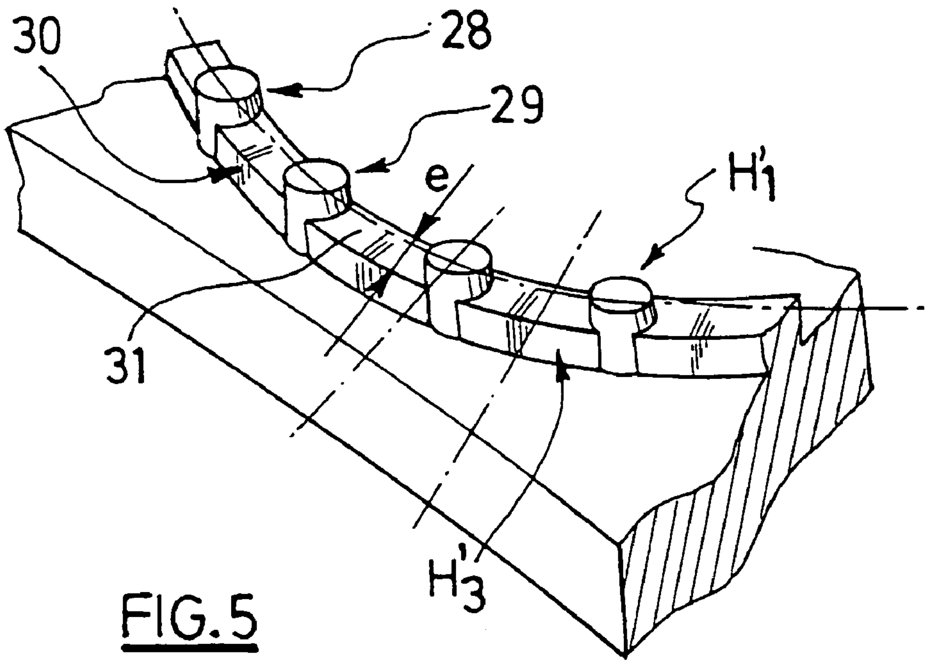
FIG. 5 is a perspective of another embodiment of the first zone's embossing tips of the invention.

FIG. 5 is another embodiment of the first zones further enhancing visual perceptibility of the embossed decoration.

Some of the first zone embossing tips are shown which run along an array of this line. In this embodiment, salients in the form of small partitions 30 are configured between the adjacent embossing tips 28 of an array. The embossing tips 28 are frustoconical or frusto-pyramidal with a flat top 29. The top 31 of the small partitions 30 is lower than the tops 29. The selected gap is between 0.4 and 0.9 mm. In other words, this is also the height differential of the heights H'1 and H'3.

The thickness "e" of the small partitions 30 is less than that of the embossing tips 28. In other words, the heights being the same, the thickness "e" is less than the embossing tip's diameter. Accordingly, the small partition thickness is less by 10 to 50% than that of the embossing tips in order in particular to limit the additional embossing pressure resulting from the presence of the small partitions. Preferably, the slope of the small partitions is the same as that of the embossing tips.

The gap between the heights H'1 and H'3 suffices to allow the rubber coming into contact with the upper small partition surface 31 during embossing and thus to at least partly emboss the small partition into the sheet.

The invention claimed is:

1. A multi-ply sheet comprising a first ply and a second ply, each ply being made of tissue paper and exhibiting a specific surface weight between 12 and 35 g/m$^2$, the first ply comprising a first embossing pattern in first zones including first protrusions projecting from an inner surface of the first ply and having corresponding alveoles on an opposite side, said first protrusions having tops of which at least more than one is connected to an opposite inner surface of the second ply, and wherein said first ply further comprises a second embossing pattern including second protrusions projecting from the inner surface of the first ply, said second protrusions having a height (H2) which is less than a height (H1) of said first protrusions and a density which is greater than that of said first protrusions, and at least more than one top of said second protrusions being situated in a plane also containing tops of the first protrusions and being connected to an inside surface of the second ply.

2. Multi-ply sheet as claimed in claim 1, wherein the first protrusions configured in the first zones have a density between 6-20 protrusions/cm$^2$.

3. Multi-ply sheet as claimed in claim 1, wherein the second protrusions are configured in second zones and have a density between 30-80 protrusions/cm$^2$.

4. Sheet as claimed in claim 2 or 3, wherein the first zones and the second zones are adjacent.

5. Sheet as claimed in claim 1, further comprising third protrusions configured as partitions linking two adjacent first protrusions.

6. Sheet as claimed in claim 1, wherein the second ply is made by a through-air-drying method.

7. Sheet as claimed in claim 1, wherein the second ply is unembossed.

* * * * *